(12) United States Patent
Chang et al.

(10) Patent No.: US 10,685,270 B2
(45) Date of Patent: Jun. 16, 2020

(54) RADIO FREQUENCY IDENTIFICATION CHIP DEVICE

(71) Applicant: Chi-Chao Chang, Tainan (TW)

(72) Inventors: Chi-Chao Chang, Tainan (TW); Tien-Hwa Ho, Taoyuan (TW)

(73) Assignee: Chi-Chao Chang, Tainan (TW)

( * ) Notice: Subject to any disclaimer, the term of this patent is extended or adjusted under 35 U.S.C. 154(b) by 53 days.

(21) Appl. No.: 15/895,397

(22) Filed: Feb. 13, 2018

(65) Prior Publication Data

US 2018/0232613 A1 Aug. 16, 2018

(30) Foreign Application Priority Data

Feb. 16, 2017 (TW) .............................. 106105074 A (51) Int. Cl.
*G06K 19/07* (2006.01)

(52) U.S. Cl.
CPC ................................. *G06K 19/0723* (2013.01)

(58) Field of Classification Search
CPC .................................................. G06K 19/0723
See application file for complete search history.

(56) References Cited

U.S. PATENT DOCUMENTS

| | | | | |
|---|---|---|---|---|
| 5,623,552 A * | 4/1997 | Lane | ...................... | G06K 13/073 382/124 |
| 6,863,220 B2 * | 3/2005 | Selker | ................. | G06K 19/0716 235/451 |
| 7,100,835 B2 * | 9/2006 | Selker | ................. | G06K 19/0716 235/451 |
| 8,400,419 B2 * | 3/2013 | Rofougaran | ............ | G06F 3/046 178/18.07 |
| 2001/0025331 A1 * | 9/2001 | Aruga | ..................... | G06Q 20/06 710/305 |
| 2007/0075140 A1 * | 4/2007 | Guez | ................... | G06K 19/0715 235/435 |
| 2009/0115578 A1 * | 5/2009 | Geissler | ............... | A01K 29/005 340/10.1 |
| 2010/0123581 A1 * | 5/2010 | Hatfield | ............. | G06K 19/0716 340/572.3 |
| 2010/0289623 A1 * | 11/2010 | Roesner | ............... | G06K 7/0008 340/10.3 |
| 2013/0285797 A1 * | 10/2013 | Paulsen | ............... | G06K 7/10128 340/10.5 |
| 2015/0234516 A1 * | 8/2015 | Frojdh | .................. | G06F 3/0412 345/173 |
| 2016/0110639 A1 * | 4/2016 | Finn | .................. | G06K 19/07788 235/439 |

* cited by examiner

*Primary Examiner* — Thien M Le
*Assistant Examiner* — Asifa Habib
(74) *Attorney, Agent, or Firm* — Muncy, Geissler, Olds & Lowe, P.C.

(57) ABSTRACT

A Radio Frequency Identification (RFID) chip device includes a carrier, and an RFID chip and a reading process inhibitor disposed on the carrier. The RFID chip is charged by a reader and transmits, when activated, an RFID signal to the reader. The reading process inhibitor includes a touch point arranged on a surface of the carrier. Charged by the reader, the reading process inhibitor is activated not later than activation of the RFID chip so as to emit an RFID disturbing signal for interfering with the RFID signal. The reading process inhibitor stops emitting the RFID disturbing signal when an electric field established thereby at the touch point is varied due to operation performed upon the touch point by the user.

3 Claims, 6 Drawing Sheets

RADIO FREQUENCY IDENTIFICATION CHIP DEVICE

CROSS-REFERENCE TO RELATED APPLICATION

This application claims priority of Taiwanese Invention Patent Application No. 106105074, filed on Feb. 16, 2017.

FIELD

The disclosure relates to a Radio Frequency Identification (RFID) chip device, and more particularly to an RFID chip device that is able to refrain from being read by a reader until a touch point thereof is operated by a user.

BACKGROUND

Radio Frequency Identification (RFID) techniques have been utilized to implement plastic money. An RFID chip device usually includes a carrier and an RFID chip disposed on or embedded in the carrier. The RFID chip includes an emitter configured to be driven to emit an RFID signal for identification, and a charging coil electrically connected to the emitter and configured to be induced by a magnetic field established by the reader so as to provide electrical power to the emitter. However, there are security concerns about the RFID chip device, such as wireless identity theft or RFID skimming. For example, the charging coil of the RFID chip device may automatically respond to an unintended reader and drive the emitter of the RFID chip device to emit the RFID signal which when captured by a malicious third party may result in identity theft or credit card fraud.

A conventional approach to reducing the risk of wireless identity theft the RFID chip device is exposed to is to cover the RFID chip device with a protector (e.g., an RFID blocking sleeve or wallet) which is capable of isolating the RFID chip device from external electromagnetic field. However, it is troublesome for a user to take out the RFID chip device from the protector every time before use.

SUMMARY

Therefore, an object of the disclosure is to provide a Radio Frequency Identification (RFID) chip device that can alleviate at least one of the drawbacks of the prior art.

According to one aspect of the disclosure, when being brought into a read range of an RFID reader, the RFID chip device is able to refrain from being read by the RFID reader until a touch point of the RFID chip device is operated by a user. The RFID chip device includes a carrier, an RFID chip and a reading process inhibitor. The RFID chip is disposed on the carrier and is configured to be charged by the RFID reader and to, when activated, transmit an RFID signal to the RFID reader. The reading process inhibitor is disposed on the carrier, and includes the touch point which is arranged on a surface of the carrier and which is accessible to the user for being operated thereby. The reading process inhibitor, when being charged by the RFID reader, is activated not later than activation of the RFID chip so as to emit an RFID disturbing signal for interfering with the RFID signal transmitted by the RFID chip and to be received by the RFID reader. The reading process inhibitor is configured to establish an electric field at the touch point, and to, when the electric field thus established is varied due to operation performed upon the touch point by the user, stop emitting the RFID disturbing signal.

According to another aspect of the disclosure, the reading process inhibitor is to be charged by the RFID reader so as to be activated to emit an RFID disturbing signal for interfering with an RFID signal transmitted by the RFID chip device. The reading process inhibitor includes the charging coil and the inhibitor circuit. The charging coil is configured to generate electricity that is induced by the electromagnetic field generated by the RFID reader. The inhibitor circuit includes the touch point that is to be operated by the user. The inhibitor circuit is electrically connected to the charging coil for receiving the electricity generated thereby so as to be activated to emit the RFID disturbing signal. The inhibitor circuit is configured to establish the electric field at the touch point, and to, when the electric field thus established is varied due to operation performed upon the touch point by the user, stop emitting the RFID disturbing signal.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
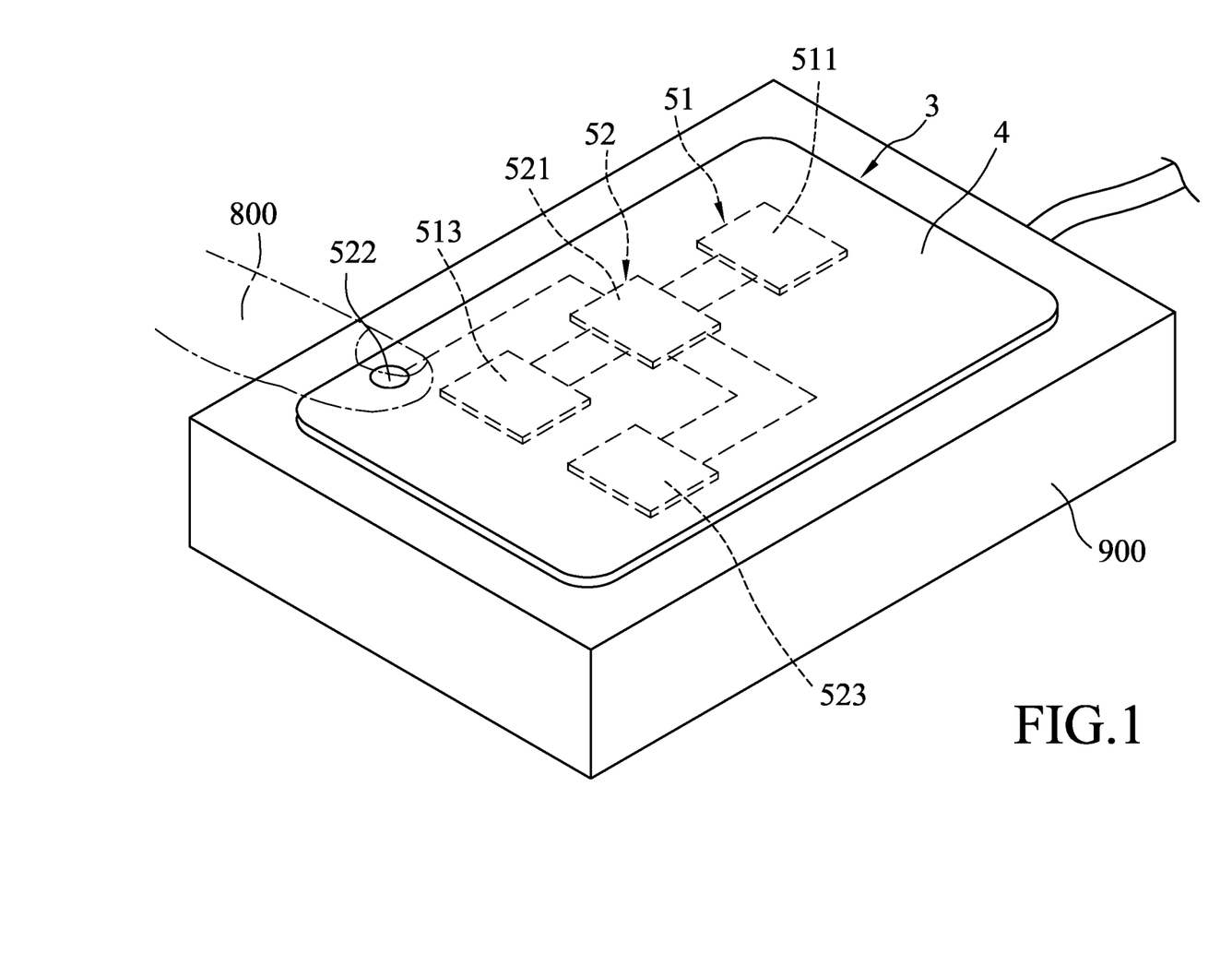
FIG. 1 is a schematic diagram illustrating a first embodiment of a Radio Frequency Identification (RFID) chip device which is being read by a reader according to the disclosure.
Figure 2:
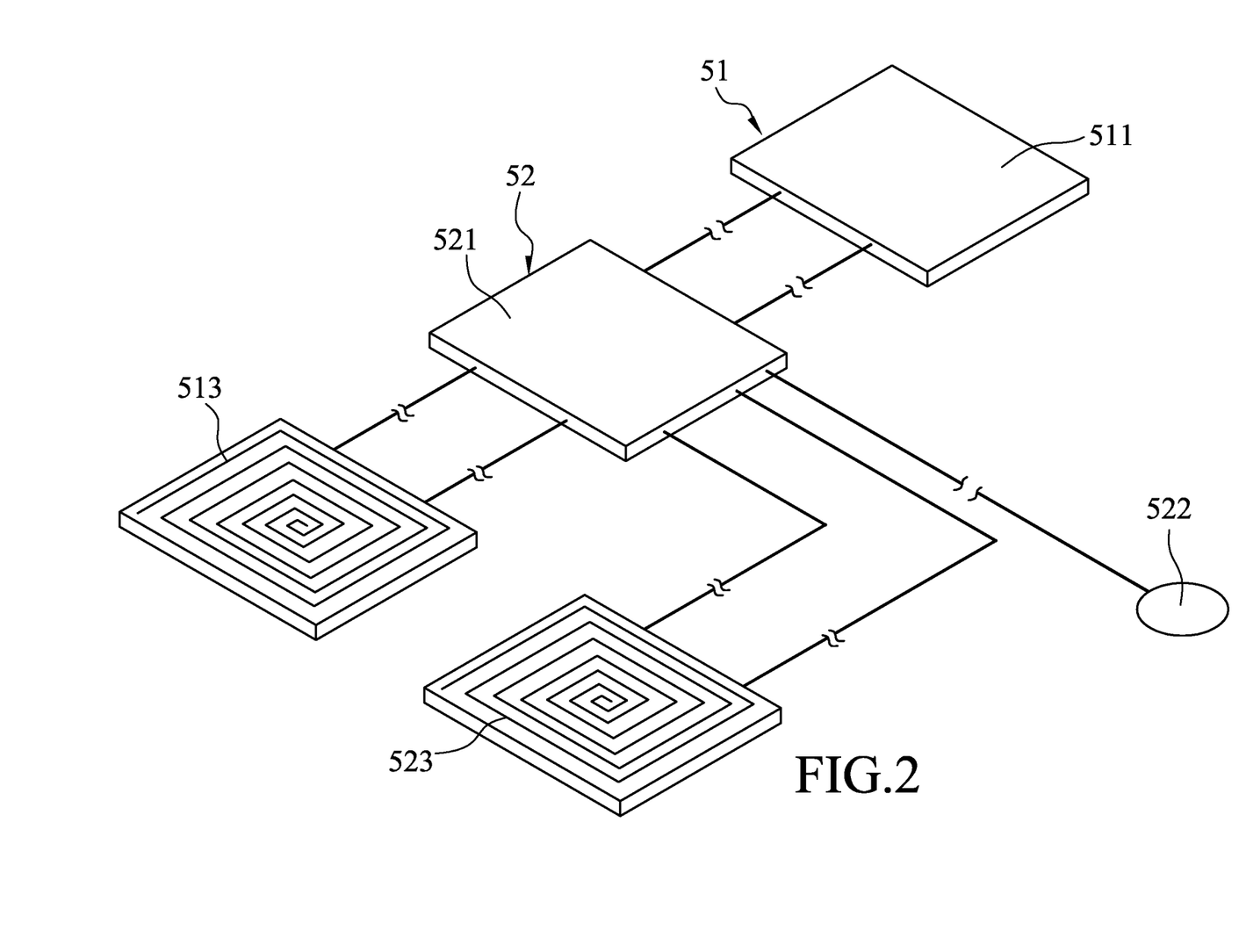
FIG. 2 is a perspective view illustrating layout of an RFID chip and a reading process inhibitor included in the first embodiment of the RFID chip device according to the disclosure.
Figure 3:
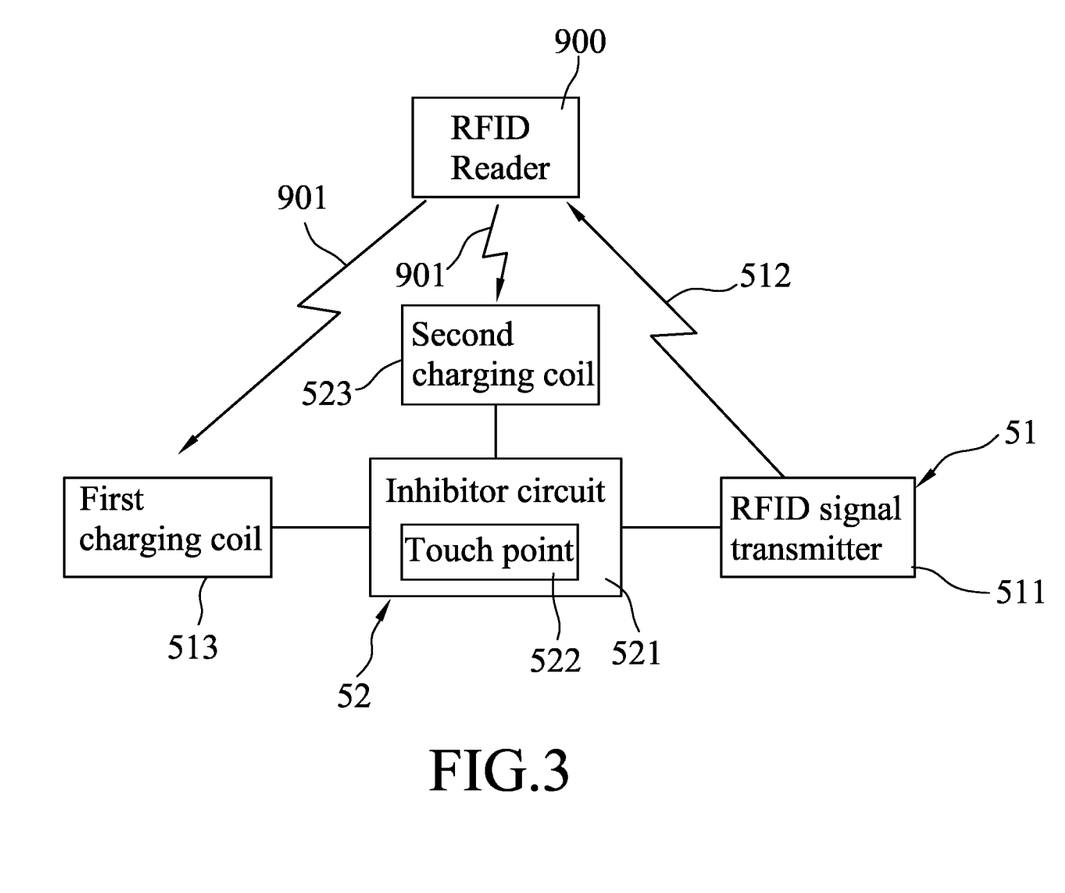
FIG. 3 is a block diagram illustrating the first embodiment of the RFID chip device according to the disclosure.

Referring to FIGS. 1 to 3, a first embodiment of a Radio Frequency Identification (RFID) chip device 3 according to the disclosure is illustrated. When being brought into a read range of an RFID reader 900, the RFID chip device 3 is able to refrain from being read by the RFID reader 900 until a touch point 522 of the RFID chip device 3 is operated by a user 800 (e.g., the user 800 touches the touch point 522 with his/her finger).

The RFID chip device 3 includes a carrier 4, an RFID chip 51 and a reading process inhibitor 52.

In this embodiment, the carrier 4 is implemented by a plastic card such as a credit card. However, implementation of the carrier 4 is not limited thereto and may vary in other embodiments. For example, the carrier 4 may be implemented by an electronic device such as a smartphone, a tablet computer, a smartwatch or a pair of smartglasses.

The RFID chip 51 is disposed on the carrier 4. The RFID chip 51 is configured to be charged by the RFID reader 900 and to, when activated, transmit an RFID signal 512 to the RFID reader 900. The RFID signal 512 contains identity data for identification and/or information for payment. However, the implementation of the RFID signal 512 is not limited to the disclosure herein and may contain any other information based on different needs.

Specifically speaking, the RFID chip 51 includes a first charging coil 513 and an RFID signal transmitter 511. The first charging coil 513 is configured to generate electricity that is induced by an electromagnetic field 901 generated by the RFID reader 900. The RFID signal transmitter 511 is electrically connected to the first charging coil 513 for receiving the electricity generated thereby so as to be activated to transmit the RFID signal 512.

The reading process inhibitor 52 is disposed on the carrier 4, and includes an inhibitor circuit 521 and a second charging coil 523.

The inhibitor circuit 521 is electrically connected between the first charging coil 513 and the RFID signal transmitter 511. The second charging coil 523 is electrically connected to the inhibitor circuit 521. The second charging coil 523 is configured to generate electricity that is induced by the electromagnetic field 901 generated by the RFID reader 900 for activating the inhibitor circuit 521.

The inhibitor circuit 521 includes the touch point 522 that is arranged on a surface of the carrier 4 and that is accessible to the user 800 for being operated thereby. The inhibitor circuit 521 is configured to establish an electric field at the touch point 522. The inhibitor circuit 521 is configured to, when powered and activated by the second charging coil 523, interrupt an electrical connection between the RFID signal transmitter 511 and the first charging coil 513 so that the RFID signal transmitter 511 is deactivated and cannot transmit the RFID signal 512 which is to be received by the RFID reader 900. In this way, a reading process between the RFID reader 900 and the RFIC chip device 3 is inhibited. The inhibitor circuit 521 is configured to, when the electric field established by the inhibitor circuit 521 is varied due to operation performed upon the touch point 522 by the user 800, deactivate so as to resume the electrical connection between the RFID signal transmitter 511 and the first charging coil 513. Consequently, when the user 800 performs operation upon the touch point 522, the RFID signal transmitter 511 can receive the electricity from the first charging coil 513 so as to be activated to transmit the RFID signal 512.

In this embodiment, the RFID chip 51 and the reading process inhibitor 52 are configured to implement an interlock mechanism and are both chargeable by the RFID reader 900 via the electromagnetic field 901. The inhibitor circuit 521, when receiving the electricity generated by the second charging coil 523, is activated not later than activation of the RFID signal transmitter 511. The inhibitor circuit 521, when activated, prevents the RFID signal transmitter 511 from being activated. The electrical connection between the RFID signal transmitter 511 and the first charging coil 513 does not resume until the touch point 522 of the RFID chip device 3 is operated by the user 800. After the electrical connection between the RFID signal transmitter 511 and the first charging coil 513 has resumed, the RFID signal transmitter 511 is activated to transmit the RFID signal 512. In this embodiment, the inhibitor circuit 521 is implemented by a switch circuit that includes one or more switches, but implementation thereof is not limited to what is disclosed herein and may vary in other embodiments.

There are several ways to enable activation of the inhibitor circuit 521 prior to that of the RFID signal transmitter 511. In one embodiment, the inhibitor circuit 521 is implemented to require less power to start up than the RFID signal transmitter 511, so the inhibitor circuit 521 is activated relatively earlier than the RFID signal transmitter 511 when power of the electricity supplied to the RFID signal transmitter 511 and the inhibitor circuit 521 is smaller at the beginning. In one embodiment, charging speed of the second charging coil 523 is faster than that of the first charging coil 513, enabling the second charging coil 523 to provide more electricity to the inhibitor circuit 521 than that provided by the first charging coil 513 to the RFID signal transmitter 511 in an initial stage of wireless charging, so as to realize faster activation of the inhibitor circuit 521. It is worth to note that implementation of enabling activation of the inhibitor circuit 521 prior to that of the RFID signal transmitter 511 is not limited to what are disclosed herein and may vary in other embodiments.

The RFID chip device 3 can be utilized in transactions. The user 800 brings the RFID chip device 3 to the read range of the RFID reader 900, e.g., to bring the carrier 4 into contact with the RFID reader 900 so that the first charging coil 513 and the second charging coil 523 can be charged by the RFID reader 900 via the electromagnetic field 901. Because the inhibitor circuit 521 is activated prior to the RFID signal transmitter 511, the electrical connection between the RFID signal transmitter 511 and the first charging coil 513 is interrupted. The RFID signal transmitter 511 is consequently deactivated and cannot transmit the RFID signal 512.

To make a payment by using the RFID chip device 3, the user 800 performs operation upon the touch point 522 by touching the same with his/her finger or other body portions so that the electric field established by the inhibitor circuit 521 at the touch point 522 is varied due to effect of grounding resulting from relatively high capacitance of human body. The effect of grounding causes the electricity provided to the inhibitor circuit 521 to leak out of the inhibitor circuit 521, resulting in a decrease in voltage on the inhibitor circuit 521, and eventually, the inhibitor circuit 521 is deactivated. No longer interrupted by the inhibitor circuit 521, the electrical connection between the RFID signal transmitter 511 and the first charging coil 513 resumes, and the RFID signal transmitter 511 can be powered by the first charging coil 513 to transmit the RFID signal 512 to the RFID reader 900 for subsequent payment/transaction processing.

Requiring to be touched by the user 800 on the touch point 522 of the inhibitor circuit 521 for enabling the RFID signal transmitter 511 to transmit the RFID signal 512 to the RFID reader 900 for transaction, the RFID chip device 3 can ensure that the reading process between the RFID chip device 3 and the RFID reader 900 is performed under the user's consent. With the presence of the reading process inhibitor 52, the RFID signal transmitter 511 is inhibited from transmitting the RFID signal 512 when a malicious third party is trying to perform wireless identity theft or RFID skimming with an unauthorized reader. Moreover, it is difficult for others to operate the touch point 522 of the inhibitor circuit 521 without being noticed by the user 800. As a result, the issues of identity theft and credit card fraud on the RFID chip device 3 may be alleviated.

Figure 4:
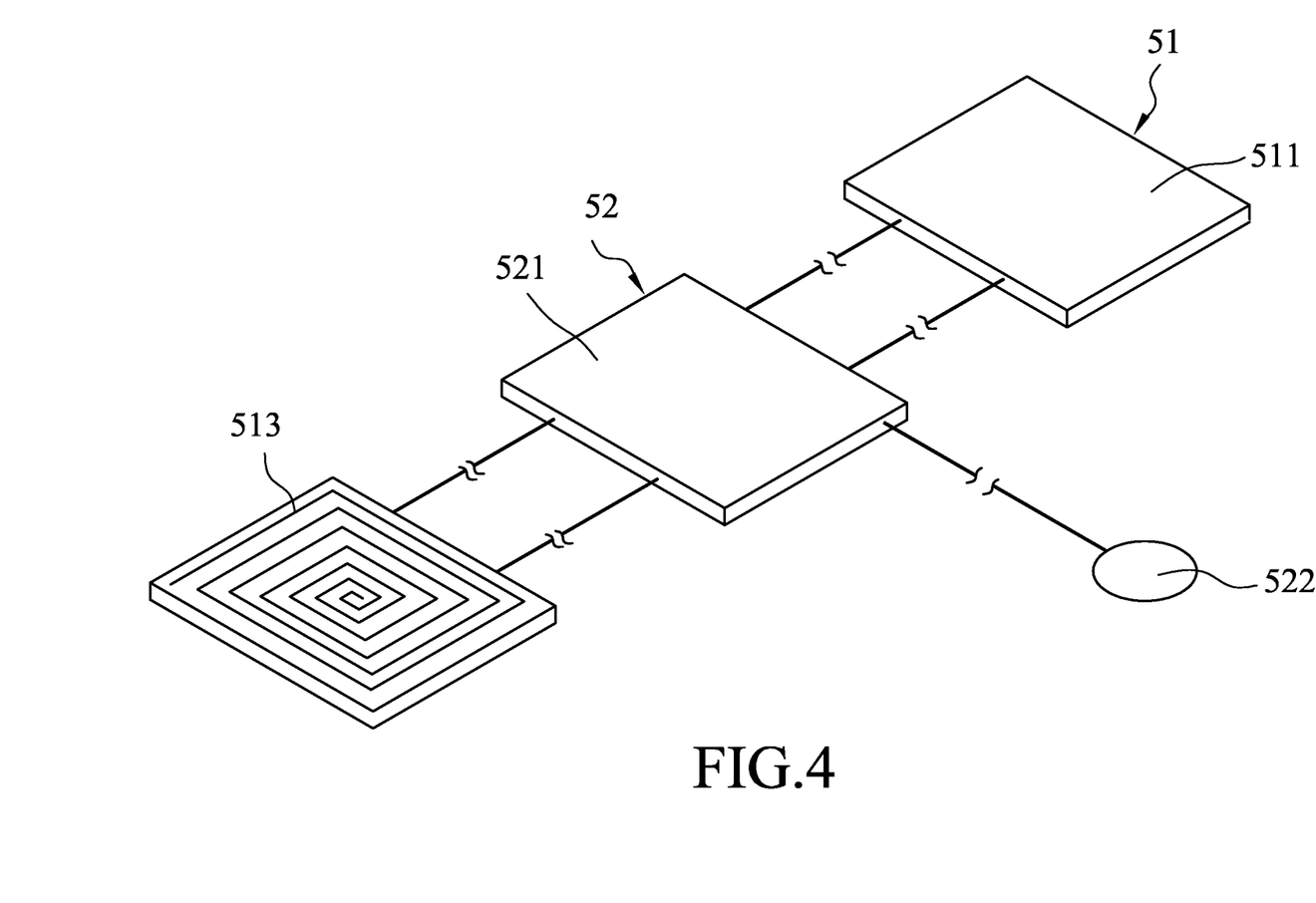
FIG. 4 is a perspective view illustrating layout of an RFID chip and a reading process inhibitor included in a second embodiment of the RFID chip device according to the disclosure.
Figure 5:
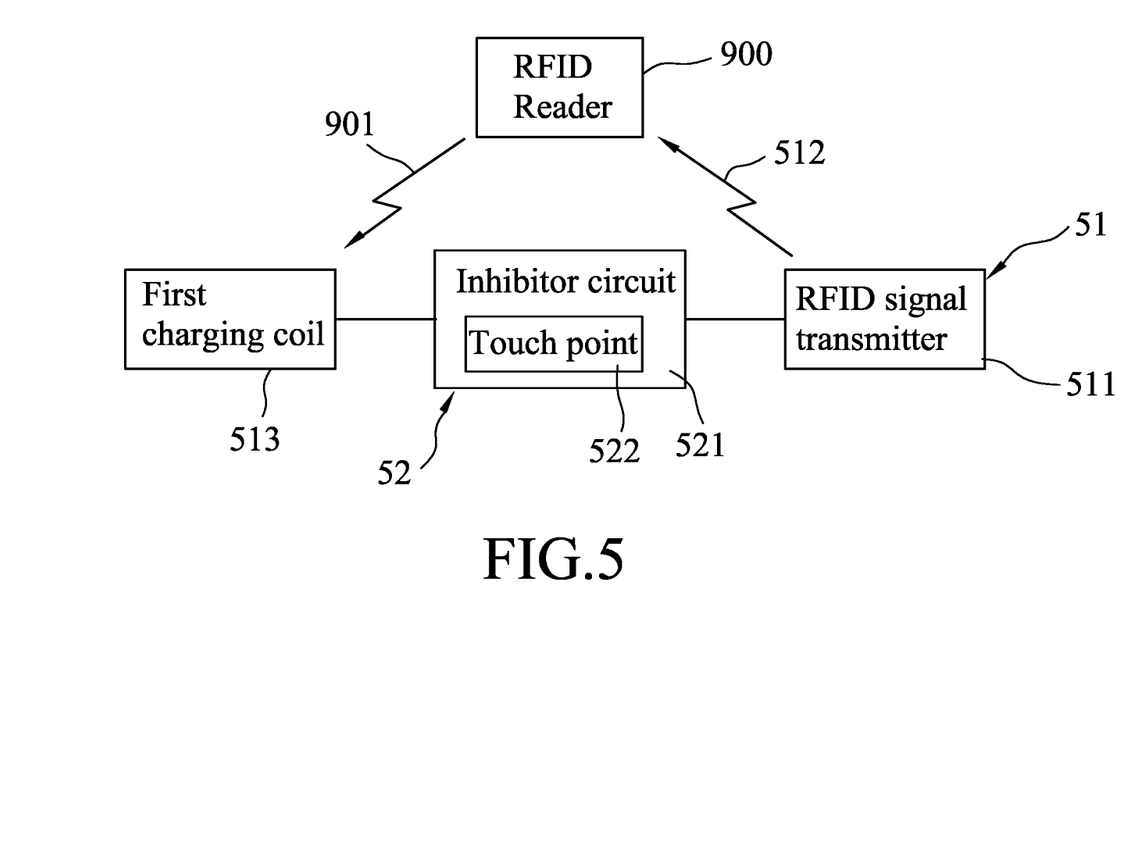
FIG. 5 is a block diagram illustrating the second embodiment of the RFID chip device according to the disclosure.

Referring to FIGS. 4 and 5, a second embodiment of the RFID chip device 3 (see FIG. 1) according to the disclosure is illustrated. The second embodiment of the RFID chip device 3 is similar to the first embodiment but is different from the first embodiment in an implementation of the reading process inhibitor 52.

In this embodiment, the reading process inhibitor 52 does not include the second charging coil 523. The inhibitor circuit 521 is electrically connected between the RFID signal transmitter 511 and the first charging coil 513. The inhibitor circuit 521 and the RFID signal transmitter 511 share the electricity generated by the first charging coil 513, but the inhibitor circuit 521 takes precedence over the RFID signal transmitter 511 so as to be charged and be activated first by the first charging coil 513. The inhibitor circuit 521 prevents the RFID signal transmitter 511 from activation so that the RFID signal 512 is not transmitted by the RFID signal transmitter 511 until the electric field established by the inhibitor circuit 521 at the touch point 522 is varied due to operation performed upon the touch point 522 by the user 800 (see FIG. 1) (e.g., the user 800 touches the touch point 522).

When the RFID chip device 3 is utilized in transactions, the user 800 brings the RFID chip device 3 to the read range of the RFID reader 900 so that the first charging coil 513 can be charged by the RFID reader 900 via the electromagnetic field 901. Next, the user 800 performs operation upon the touch point 522 by touching the same with his/her finger or other body portions so as to vary the electric field established by the inhibitor circuit 521 at the touch point 522 for deactivating the inhibitor circuit 521. No longer inhibited by the inhibitor circuit 521, the electrical connection between the RFID signal transmitter 511 and the first charging coil 513 is resumed, and the RFID signal transmitter 511 can be powered by the first charging coil 513 to transmit the RFID signal 512 to the reader 900 for payment/transaction processing. Therefore, issues of wireless identity theft and RFID skimming can be alleviated by the RFID chip device 3 of this embodiment.

Figure 6:
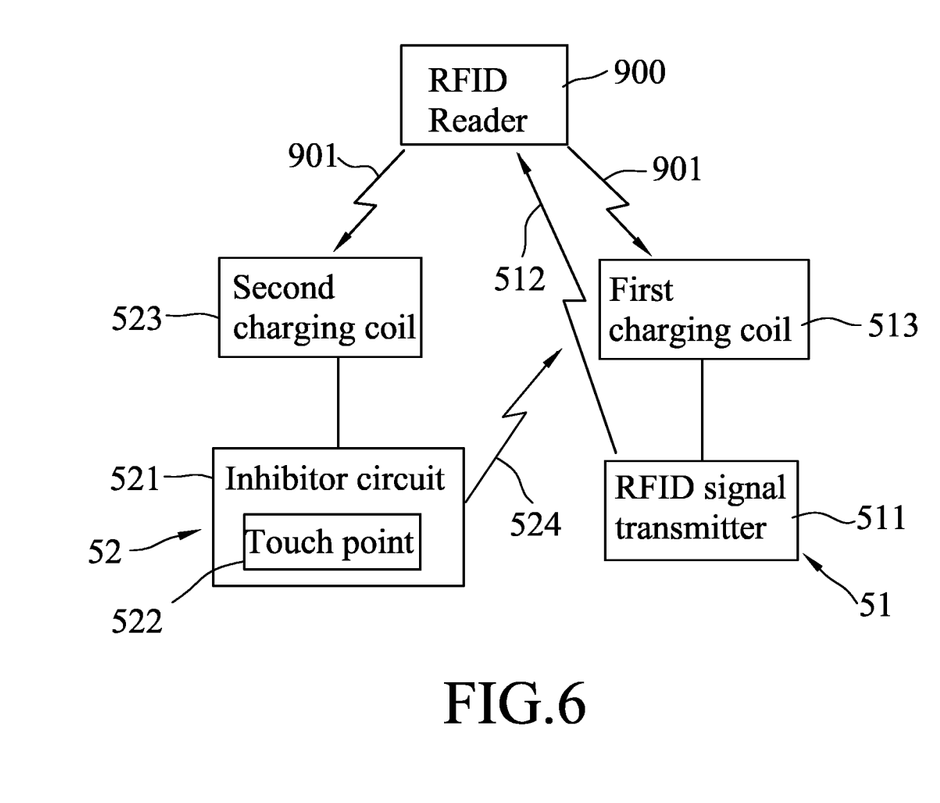
FIG. 6 is a block diagram illustrating a third embodiment of the RFID chip device according to the disclosure.

Referring to FIG. 6, a third embodiment of the RFID chip device 3 (see FIG. 1) is illustrated. The third embodiment of the RFID chip device 3 is similar to the first embodiment but is different from the first embodiment in the implementation of the reading process inhibitor 52.

The reading process inhibitor 52 and the RFID chip 51 of the third embodiment are not electrically connected to each other by physical wires and are simultaneously charged and activated by the RFID reader 900 via the electromagnetic field 901.

The reading process inhibitor 52 includes the touch point 522 which is arranged on the surface of the carrier (see FIG. 1) and which is accessible to the user 800 (see FIG. 1) for being operated thereby. The reading process inhibitor 52, when being charged by the RFID reader 900, is activated not later than activation of the RFID chip 51 so as to emit an RFID disturbing signal 524 for interfering with the RFID signal 512 transmitted by the RFID chip 51 and to be received by the RFID reader 900. The reading process inhibitor 52 is configured to establish the electric field at the touch point 522, and to, when the electric field thus established is varied due to operation performed upon the touch point 522 by the user 800, stop emitting the RFID disturbing signal 524.

Specifically speaking, the touch point 522 of the reading process inhibitor 52 is disposed on the inhibitor circuit 521 of the reading process inhibitor 52. The second charging coil 523 of the reading process inhibitor 52 is configured to generate electricity which is induced by the electromagnetic field 901 generated by the RFID reader 900. The inhibitor circuit 521 is electrically connected to the second charging coil 523 for receiving the electricity generated thereby so as to be activated to transmit the RFID disturbing signal 524 for interfering with the RFID signal 512 to be received by the RFID reader 900, and to establish the electric field on the touch point 522. In this embodiment, the inhibitor circuit 521 is implemented by an antenna capable of emitting the RFID disturbing signal 524.

For example, when the RFID chip device 3 is utilized for transaction, the user 800 brings the RFID chip device 3 to the read range of the RFID reader 900 so that the first charging coil 513 and the second charging coil 523 each generate the electricity which is induced by the RFID reader 900 via the electromagnetic field 901. Charged by the second charging coil 523, the inhibitor circuit 521 transmits the RFID disturbing signal 524 which interferes with the RFID signal 512 transmitted by the RFID signal transmitter 511 so that the RFID signal 512 cannot be correctly received by the RFID reader 900. Then, the user 800 performs operation upon the touch point 522 by touching the same with his/her finger or other body portions so as to vary the electric field established by the inhibitor circuit 521 at the touch point 522 for deactivating the inhibitor circuit 521 through the effect of grounding. After inhibition of the inhibitor circuit 521 is removed, i.e., the inhibitor circuit 521 stops transmitting the RFID disturbing signal 524, the RFID signal 512 transmitted by the RFID signal transmitter 511 for payment/transaction can be correctly received by the RFID reader 900.

Interfered by the RFID disturbing signal 524 emitted by the reading process inhibitor 52, the RFID signal 512 transmitted by the RFID signal transmitter 511 may not be correctly read by an unauthorized reader when a malicious third party is trying to perform wireless identity theft or RFID skimming with the unauthorized reader. As a result, issues of identity theft and credit card fraud on the RFID chip device 3 are alleviated.

In this embodiment, the RFID chip 51 and the reading process inhibitor 52 are separate from each other, and each of the RFID chip 51 and the reading process inhibitor 52 includes an independent charging coil (i.e., the first charging coil 513 for the RFID chip 51 and the second charging coil 523 for the reading process inhibitor 52), so the RFID signal transmitter 51 of the RFID chip 51 and the inhibitor circuit 521 of the reading process inhibitor 52 can be separately and independently charged. However, in other embodiments, the reading process inhibitor 52 can share an identical charging coil with the RFID chip 51. In other words, the inhibitor circuit 521 and the RFID signal transmitter 511 are both electrically connected to the first charging coil 513. Since the inhibitor circuit 521 is configured to, when being charged by the RFID reader 900, be activated not later than activation of the RFID signal transmitter 511, the inhibitor circuit 521 is able to transmit the RFID disturbing signal 524 for interfering with the RFID signal 512 transmitted by the RFID signal transmitter 511.

It is worth to note that in one embodiment, the reading process inhibitor 52 is an independent, separate device and is not included in the RFID chip device 3. When both the reading process inhibitor 52 and the RFID chip device 3 are put together in a wallet or a backpack, interference between the RFID disturbing signal 524 emitted by the reading process inhibitor 52 and the RFID signal 512 transmitted by the RFID signal transmitter 511 can prevent the RFID signal 512 from being correctly read by an unauthorized reader when a malicious third party intends to perform RFID skimming with the unauthorized reader. As a result, issues of identity theft or credit card fraud on the RFID chip device 3 are alleviated.

In this embodiment, the RFID chip 51 is charged by the RFID reader 900 and transmits, when activated, the RFID signal 512 to the RFID reader 900. Charged by the RFID reader 900, the reading process inhibitor 52 is activated not later than activation of the RFID chip 51 so as to emit the RFID disturbing signal 524 for interfering with the RFID signal 512. The reading process inhibitor 52 stops emitting the RFID disturbing signal 524 when the electric field established thereby at the touch point 522 is varied due to operation performed upon the touch point 522 by the user 800, enabling the RFID signal 512 to be received by the RFID reader 900. In this way, concerns about identity theft and credit card fraud when using the RFID chip device 3 can be mitigated, and security of the RFID chip device 3 can be promoted.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A Radio Frequency Identification (RFID) chip device, when being brought into a read range of an RFID reader, that is able to refrain from being read by the RFID reader until a touch point of said RFID chip device is operated by a user, said RFID chip device comprising:
    a carrier;
        an RFID chip disposed on said carrier and configured to be charged by the RFID reader and to, when activated, transmit an RFID signal to the RFID reader; and
        a reading process inhibitor that is disposed on said carrier, and that includes said touch point which is arranged on a surface of said carrier and which is accessible to the user for being operated thereby,
    wherein said reading process inhibitor, when being charged by the RFID reader, is activated not later than activation of said RFID chip so as to emit an RFID disturbing signal for interfering with the RFID signal transmitted by said RFID chip and to be received by the RFID reader,
    wherein said reading process inhibitor is configured to establish an electric field at said touch point, and to, when the electric field thus established is varied due to operation performed upon said touch point by the user, stop emitting the RFID disturbing signal,
    wherein said reading process inhibitor includes
        a second charging coil which is configured to generate electricity that is induced by an electromagnetic field generated by the RFID reader, and
        an inhibitor circuit on which said touch point is disposed, which is electrically connected to said second charging coil for receiving the electricity generated thereby so as to be activated to transmit the RFID disturbing signal, and which is implemented to require less power to start up than said RFID chip.

2. The RFID chip device as claimed in claim 1, wherein: said RFID chip includes
    a first charging coil configured to generate electricity that is induced by an electromagnetic field generated by the RFID reader, and
    an RFID signal transmitter electrically connected to said first charging coil for receiving the electricity generated thereby so as to be activated to transmit the RFID signal; and
said reading process inhibitor is electrically connected to said first charging coil for receiving the electricity generated thereby so as to be activated to emit the RFID disturbing signal.

3. A Radio Frequency Identification (RFID) chip device, when being brought into a read range of an RFID reader, that is able to refrain from being read by the RFID reader until a touch point of said RFID chip device is operated by a user, said RFID chip device comprising:
    a carrier;
    an RFID chip disposed on said carrier and configured to be charged by the RFID reader and to, when activated, transmit an RFID signal to the RFID reader; and
    a reading process inhibitor that is disposed on said carrier, and that includes said touch point which is arranged on a surface of said carrier and which is accessible to the user for being operated thereby,
    wherein said reading process inhibitor, when being charged by the RFID reader, is activated not later than activation of said RFID chip so as to emit an RFID disturbing signal for interfering with the RFID signal transmitted by said RFID chip and to be received by the RFID reader,
    wherein said reading process inhibitor is configured to establish an electric field at said touch point, and to, when the electric field thus established is varied due to operation performed upon said touch point by the user, stop emitting the RFID disturbing signal,
    wherein said reading process inhibitor includes
        a second charging coil which is configured to generate electricity that is induced by an electromagnetic field generated by the RFID reader, and
        an inhibitor circuit on which said touch point is disposed, and which is electricalh connected to said second charging coil for receiving the electricity generated thereby so as to be activated to transmit the RFID disturbing signal,
    wherein charging speed of said second charging coil is faster than that of said RFID chip.

* * * * *